Figure 1:
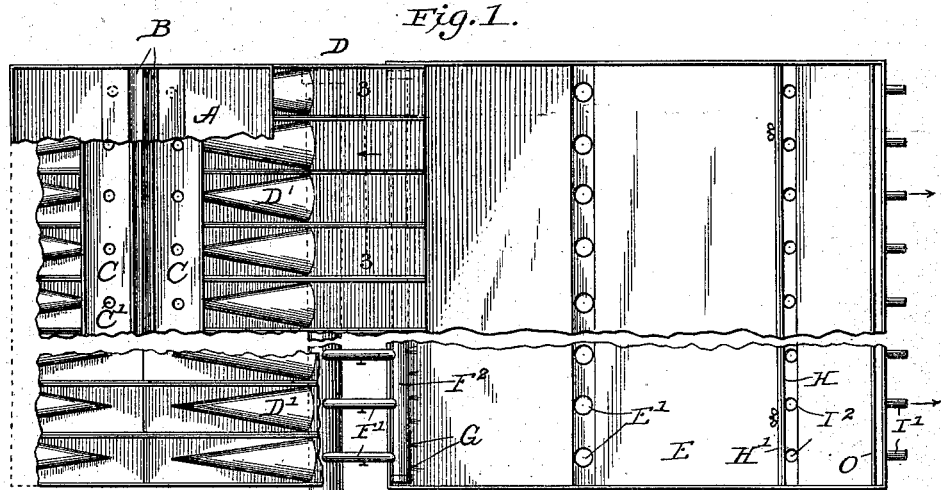

No. 734,641. PATENTED JULY 28, 1903.
C. F. WHEELOCK.
ORE SEPARATOR.
APPLICATION FILED JULY 16, 1901.
NO MODEL.

Witnesses:
Harry S. Rohrer
Wallace Greene

Inventor
Charles F. Wheelock
by C. H. Cramer
Attorney

No. 734,641. Patented July 28, 1903.

UNITED STATES PATENT OFFICE.

CHARLES F. WHEELOCK, OF BIRMINGHAM, ALABAMA.

ORE-SEPARATOR.

SPECIFICATION forming part of Letters Patent No. 734,641, dated July 28, 1903.

Application filed July 16, 1901. Serial No. 68,492. (No model.)

*To all whom it may concern:*

Be it known that I, CHARLES F. WHEELOCK, a citizen of the United States, residing at Birmingham, in the county of Jefferson and State of Alabama, have invented certain new and useful Improvements in Ore-Separators; and I do hereby declare the following to be a full, clear, and exact description of the invention, such as will enable others skilled in the art to which it appertains to make and use the same.

My invention relates particularly to separating graphite from crushed rock or sand, the general object being to provide apparatus that will rapidly and perfectly eliminate substantially all the sand, while saving practically all the graphite. Unfortunately the specific gravity of the graphite and sand is nearly the same; but, on the other hand, dry graphite has the greater water-repelling power, and, so far as I am aware, all processes and apparatus now actually employed for separating the two depend in whole or in part upon this difference, in that each involves placing the material to be separated upon the surface of water and floating off the graphite, while leaving the more easily wet, and hence more quickly sinking, sand. Perfect separation requires that the material be so handled that each particle of sand shall be free to sink and that the graphite shall be quickly floated off, for sand may be buoyed up by the graphite, and in spite of a somewhat greater repelling-power a part of the graphite soon becomes wet and then at once sinks. It is of course desirable for economic reasons that there should be no loss of graphite through its sinking with the sand and that the apparatus should be inexpensive, require little attendance, and be capable of handling large quantities of material rapidly. In fact, the practically perfect and successful solution of the problem involves nicety in balancing many conditions which are not found in separating any other materials with which I am acquainted.

Many expedients have been devised. Allowing the material to fall upon the surface of water in an overflowing tank supplied by an upward current from below secures satisfactory separation, but the output is very small. Allowing it to fall upon a sheet of water flowing down an incline into an overflowing tank results in material loss through wetting of the graphite, and if it be attempted to lessen this loss by securing a smooth water-surface throughout the partial success achieved is at the expense of more water than is obtainable in many situations. It has been proposed to blow the falling material over the surface; but this involves intolerable dust and loss, and where the dust is lessened by a spray of water the spray wets the graphite, and thus increases the loss. Yet in all apparatus where the material is not placed upon the water uniformly in such manner as to leave all the sand particles free to sink there is either imperfect separation or much loss of graphite. Owing to the difficulties suggested, many, if not all, establishments are today accepting as unavoidable imperfect separation, loss of graphite, or a very slow, and hence expensive apparatus. While owning rights under patents involving some of these devices and after practically using some of the others and seeing the remainder in practical use by others, I have devised the apparatus hereinafter set forth, which successfully attains the general object stated at the outset. This apparatus involves delivering an extremely thin uniform layer of material upon a thin but smoothly and rapidly moving surface stratum of water resting upon a comparatively thick quiescent stratum. The material before being delivered upon the moving water is, while entirely dry, itself given a somewhat rapid movement in the general direction of the water and making but a small angle therewith, the arrangement being such that there is no appreciable fall of the material when it comes in contact with the liquid.

Figure 4:
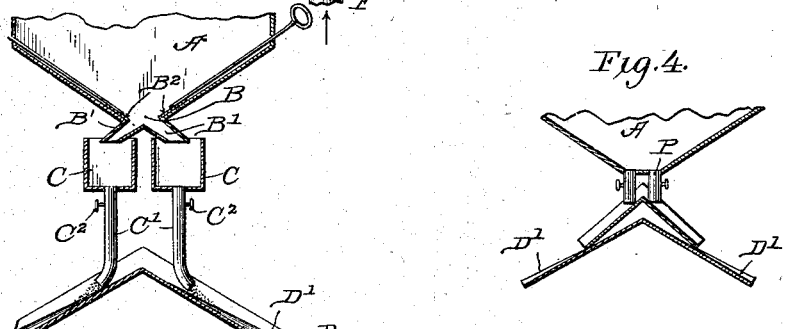
Figure 3:
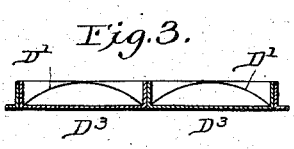
Figure 2:
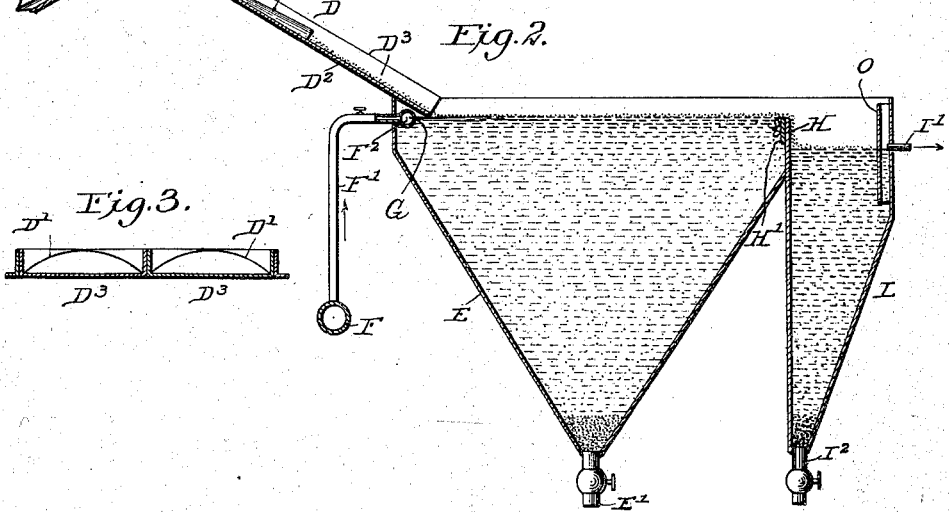

In the accompanying drawings, Figure 1 is a plan view of a little more than one-half of a duplicate apparatus, parts being broken away. Fig. 2 is an elevation, partly in section, showing the same apparatus. Fig. 3 is a section at 3 3, Fig. 1. Fig. 4 shows a slightly-modified construction.

In the figures, A represents a large reservoir, forty feet (more or less) in length. It has a V-shaped bottom, from the lowest part of which the material is discharged through openings B, leading to two oppositely-divergent spouts B' and cut off in whole or in part at will by slides B². Each spout discharges into a box C of the same length as the reservoir, and from each box the material passes through a series of pipes C', arranged at short intervals in the bottom of the box, having their lower ends curved outward, so that they deliver at a comparatively small angle with the horizon, and provided with independent cut-offs, as at C². The halves of the apparatus below these pipes are symmetrically identical, and hence but one part is shown and but one will be described in detail. In construction one half may be omitted, if desired, and, in fact, even when both parts are provided one only may be used, delivery to the other being cut off.

Just below the outward-curved ends of the long row of pipes C' is an inclined chute D, having upon its plane bottom a series of partial cones D', whose smaller ends lie, respectively, just below the pipes, and whose larger ends are but slightly separated. The chute extends for some distance below the base of the partial cone, and as the material is delivered by the pipe it is spread very evenly by the cone, and falling from its end slides down the remaining portion D² of the chute as a very thin uniform layer, prevented from passing laterally from the chute by side pieces D³. Preferably this chute is made in separate sections D⁰, Fig. 3, so that the valve in the corresponding pipe being closed any one may be removed while the apparatus is in operation. When so made, each section contains one cone and is provided with side pieces D³, so that when removed no material may be lost from the adjacent sections.

Below the lower end of the chute D is a deep water-receptacle E as long as the reservoir A and provided with a V-shaped bottom, from which depend a series of valved sand-discharging pipes E'. Water is supplied to this receptacle from a large pipe F, extending from side to side of the apparatus at any convenient point, the delivery being through numerous small valved pipes F' all discharging into a pipe F², which lies under and in the rear of the delivery end of the sheet D. This pipe F² is closed at each end and provided with a series of lateral perforations G, (preferably not in line with the pipes F',) through which the water is discharged in a horizontal plane in or slightly below the surface of the water in the receptacle E, whereby a thin surface stratum of water is made to flow rapidly under and nearly in contact with the discharge end of the chute D D². The advance of this stratum at the end of the chute D D² is preferably more rapid than the advance of the material which is delivered upon it, and hence the sheet of material is thinned at this point to be gradually thickened again as the stratum loses its momentum and gains in depth. That side H of the receptacle opposite the pipe F² is lower than the other walls to allow overflow, and the water-level is of course determined by the height of this side, which may be regulated by a slide H'. The moving stratum of water bearing graphite from which the sand has fallen in the receptacle E on passing over the wall H plunges into a body of water in a compartment L, provided with a series of discharge-pipes I', which keep the water at a constant level some distance below that of the water in the receptacle E. In this plunging the graphite becomes wet, and therefore sinks to the bottom of the compartment, which is V-shaped and provided with a series of valved discharge-tubes I², through which the graphite is withdrawn precisely as the sand is discharged through the pipes E'. To prevent loss of any small amount of graphite that may fail to become wet by the plunge, and therefore temporarily float, a shield is placed over the pipes I' and extended for some distance above and below the water's surface, and the gentle upward current into the space between this shield and the wall of the compartment practically draws up no graphite.

For the practical success of this apparatus—that is, to obtain large output of practically pure graphite with no material loss in the separating-tank—it is indispensable to have a very thin, rapidly-moving, and substantially uniform layer of graphite delivered upon the water at a small angle.

I have not obtained satisfactory results in allowing the material to fall through a long continuous slot in the reservoir directly upon an inclined chute with or without spreading cones, but by delivering it through small pipes near the tips of the cones, respectively, practically uniform spreading is secured, especially when the cones terminate at some distance above the lower end of the chute, so that the material after leaving the cones passes down a smooth inclined plane.

In Fig. 4 I have illustrated, omitting the boxes C and providing the reservoir with a small valved opening P for each cone, each discharging into an inclined trough, which changes the vertical direction of the material and discharges it at the upper end of the corresponding cone and approximately in the direction it must afterward follow. This form is successful; but as many tons of material are often placed in the large reservoir at once accidental obstruction of an opening sometimes causes much trouble. When the boxes are used, it is evident that obstruction of the long slots in the reservoir is less likely to occur, and should it occur little trouble is occasioned, because the slot may be widened, allowing obstructing matter to pass, or, at least, insuring proper supply to the box below; and should there be obstruction of a pipe leading from the box the quantity of material in the box is so small that the hand easily remedies the evil. It is also important that the falling material should be deflected, so that its momentum is not lost, whereby it begins its course over the cones with some acquired velocity, which causes more perfect spreading and also increases the output. This is the more important because increasing delivery by increasing the angle of the chute insures wetting and loss when the water is reached. It is also essential that there should be no sudden drop of the material to the water in the first or separating vessel, and for this reason also the cones should terminate above the lower end of the chute. It is also of great consequence that the sheet of material should be thin, for otherwise the separation would not be complete, especially when the time allowed for passing over the separating vessel is short, as it must necessarily be. It is true that by widening the vessel greater time might be allowed for passing over it without diminishing the feed of material to the apparatus; but it is to be remembered that although dry graphite repels water it nevertheless soon becomes wet and sinks. Hence it must be quickly passed over the water in this vessel.

What I claim is—

1. The combination of a vessel adapted to be filled with water and provided with means for precisely determining the level of the water, a chute declining toward and adapted to reach said level; a transverse water-pipe slightly below the water-level, approximately parallel with and in proximity to the discharge edge of the chute and discharging laterally in the same general direction as the chute; means for delivering water under pressure to said pipe; means for regulating said pressure; and means for causing a thin uniform stratum of dry graphite to descend the chute.

2. In a graphite-separator, the combination with a water-receptacle adapted to discharge by overflow along one side, of devices at the opposite side adapted to forcibly impel toward the discharge side the surface stratum of the water filling the receptacle, a plane chute inclined downwardly toward said discharge side, a material-spreading cone fixed in said chute with its base at some distance from the lower end of the same, whereby the material which it spreads falls upon the bottom of the chute and slides smoothly upon the water, and means for discharging material upon the upper small portion of the cone.

3. In a graphite-separator, the combination with a long, narrow water-receptacle arranged to discharge by overflow at one of its longer sides, of a pipe extending along the opposite side substantially in the plane of the overflow edge and provided with a series of apertures along the side toward the overflow, a chute extending from end to end of the receptacle, inclined downwardly toward the overflow side and terminating substantially at the plane of the water's surface and a little in advance of said pipe, a series of partial cones fixed in the chute above its lower end, a hopper, above the upper part of the chute, adapted to discharge material to be spread by each cone, a larger storage-hopper above the small hopper and adapted to discharge into all parts of the latter, and means for controlling the amount of material discharged upon the chute.

4. The combination with the narrow water-containing vessel adapted to discharge by overflowing along one longer side, of a water-conveying pipe lying substantially in the surface stratum of water at the side opposite the overflow and having lateral apertures adapted to discharge in the plane of said stratum and toward the overflow, the sectional chute inclined downwardly toward the overflow and terminating in advance of the said pipe and approximately at the surface of the water, the spreading-cones fixed on said chute at some distance above its end, a hopper above the upper end of the chute, conduits leading from the hopper and adapted to discharge material therefrom upon the upper portion of the chute and in a direction approximately parallel to its downwardly-inclined bottom, and means for controlling the rate of such discharge.

In testimony whereof I affix my signature in presence of two witnesses.

CHARLES F. WHEELOCK.

Witnesses:
  FELIX L. SMITH,
  WALTER SMITH.